(12) United States Patent
Klein et al.

(10) Patent No.: US 11,263,334 B2
(45) Date of Patent: *Mar. 1, 2022

(54) METHOD AND SYSTEM FOR NATIVELY ACCESSING ENTERPRISE DATA ACCORDING TO AN IDENTIFIED VIEW CONTEXT

(71) Applicant: ADP, LLC, Roseland, NJ (US)

(72) Inventors: Eitan Klein, New York, NY (US); Dan Bar-Lev, New York, NY (US); Richard Noad, New York, NY (US); Norman Azoulay, New York, NY (US); Robert Shewan, New York, NY (US)

(73) Assignee: ADP, LLC, Roseland, NJ (US)

( * ) Notice: Subject to any disclaimer, the term of this patent is extended or adjusted under 35 U.S.C. 154(b) by 447 days.

This patent is subject to a terminal disclaimer.

(21) Appl. No.: 16/444,970

(22) Filed: Jun. 18, 2019

(65) Prior Publication Data

US 2020/0401714 A1    Dec. 24, 2020

(51) Int. Cl.
*H04L 29/06* (2006.01)
*G06F 21/62* (2013.01)
*G06F 9/54* (2006.01)
*G06Q 10/10* (2012.01)

(52) U.S. Cl.
CPC .......... *G06F 21/6218* (2013.01); *G06F 9/547* (2013.01); *H04L 63/0281* (2013.01); *H04L 63/08* (2013.01); *G06Q 10/105* (2013.01)

(58) Field of Classification Search
CPC . G06F 21/6218; G06F 9/547; H04L 63/0281; H04L 63/08; G06Q 10/105
See application file for complete search history.

(56) References Cited

U.S. PATENT DOCUMENTS

| | | | |
|---|---|---|---|
| 7,865,959 B1* | 1/2011 | Lewis | G06F 21/6218 726/26 |
| 8,204,922 B2 | 6/2012 | Rangadass | |
| 9,081,981 B2 | 7/2015 | Lim | |
| 9,473,506 B1* | 10/2016 | Hensley | H04L 63/06 |
| 10,181,047 B2 | 1/2019 | Lim | |
| 2002/0111814 A1* | 8/2002 | Barnett | G06Q 30/02 705/1.1 |
| 2005/0033726 A1* | 2/2005 | Wu | G06F 16/25 |
| 2008/0307510 A1* | 12/2008 | Sakakibara | H04N 1/444 726/4 |

(Continued)

*Primary Examiner* — Ghodrat Jamshidi
(74) *Attorney, Agent, or Firm* — Yee & Associates, P.C.

(57) ABSTRACT

A method, apparatus, and computer program product for validating a structured data object. A computer system receives a request to access enterprise data within a human resources database. The request is received from a consuming service within an authentication context of the user. The computer system determines a view context for the human resources (HR) database by applying a business rule to the authentication context. The business rule comprises a set of data nodes that are composed into a structured data object according to a domain specific language. The computer system creates a data view of the human resources database according to the view context determined by the business rule. The computer system provides the data view to the consuming service. The consuming service natively accesses the enterprise data through the data view.

30 Claims, 7 Drawing Sheets

(56) References Cited

U.S. PATENT DOCUMENTS

| | | | |
|---|---|---|---|
| 2012/0246112 A1* | 9/2012 | Gonzalez | G06F 16/178 707/610 |
| 2013/0291025 A1* | 10/2013 | Ozawa | H04N 21/816 725/61 |
| 2017/0126614 A1* | 5/2017 | Sinha | H04L 67/42 |
| 2018/0007098 A1* | 1/2018 | Malatesha | H04L 65/4015 |

* cited by examiner

US 11,263,334 B2

METHOD AND SYSTEM FOR NATIVELY ACCESSING ENTERPRISE DATA ACCORDING TO AN IDENTIFIED VIEW CONTEXT

BACKGROUND INFORMATION

1. Field

The present disclosure relates generally to an improved computer system and, in particular, to a method and apparatus for accessing information in a computer system. Still more particularly, the present disclosure relates to a method, a system, and a computer program product for natively accessing enterprise data according to an identified view context of a user.

2. Background

Increasingly, businesses rely on business rule interpreters to conduct Internet-based business, or to generate browser-based software programs for others to use in the conduct of business. However, such programs can be complex and can be undesirably slow to compile and/or execute in real-time, especially on a Web browser when communication with a remote computer is desirable or necessary. Thus, solutions for increasing the speed of operation of a computer to create and execute business rules are desirable.

SUMMARY

An embodiment of the present disclosure provides a method for natively accessing enterprise data according to an identified view context. A computer system receives a request to access enterprise data within a human resources database. The request is received from a consuming service within an authentication context of the user. The computer system determines a view context for the human resources (HR) database by applying a business rule to the authentication context. The business rule comprises a set of data nodes that are composed into a structured data object according to a domain specific language. The computer system creates a data view of the human resources database according to the view context determined by the business rule. The computer system provides the data view to the consuming service. The consuming service natively accesses the enterprise data through the data view.

Another embodiment of the present disclosure provides a computer program product for natively accessing enterprise data according to an identified view context. The computer program product comprises a non-transitory computer readable storage media and program code, stored on the computer readable storage media. The program code includes code for receiving a request to access enterprise data within a human resources database. The request is received from a consuming service within an authentication context of the user. The program code includes code for determining a view context for the human resources (HR) database by applying a business rule to the authentication context. The business rule comprises a set of data nodes that are composed into a structured data object according to a domain specific language. The program code includes code for creating a data view of the human resources database according to the view context determined by the business rule. The program code includes code for providing the data view to the consuming service. The consuming service natively accesses the enterprise data through the data view.

Yet another embodiment of the present disclosure provides a computer system. The computer system comprises a hardware processor and a lightweight directory access protocol (LDAP) service in communication with the hardware processor. The LDAP service receives a request to access enterprise data within a human resources database. The request is received from a consuming service within an authentication context of the user. The LDAP service determines a view context for the human resources (HR) database by applying a business rule to the authentication context. The business rule comprises a set of data nodes that are composed into a structured data object according to a domain specific language. The LDAP service creates a data view of the human resources database according to the view context determined by the business rule. The LDAP service provides the data view to the consuming service. The consuming service natively accesses the enterprise data through the data view.

The features and functions can be achieved independently in various embodiments of the present disclosure, or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments provide a method, an apparatus, and a computer program product for natively accessing enterprise data according to an identified view context. In one illustrative example, a computer system receives a request to access enterprise data within a human resources database. The request is received from a consuming service within an authentication context of the user. The computer system determines a view context for the human resources (HR) database by applying a business rule to the authentication context. The business rule comprises a set of data nodes that are composed into a structured data object according to a domain specific language. The computer system creates a data view of the human resources database according to the view context determined by the business rule. The computer system provides the data view to the consuming service. The consuming service natively accesses the enterprise data through the data view.

The computer-readable program instructions may also be loaded onto a computer, a programmable data processing apparatus, or other device to cause a series of operational steps to be performed on the computer, a programmable apparatus, or other device to produce a computer implemented process, such that the instructions which execute on the computer, the programmable apparatus, or the other device implement the functions and/or acts specified in the flowchart and/or block diagram block or blocks.

Figure 1:
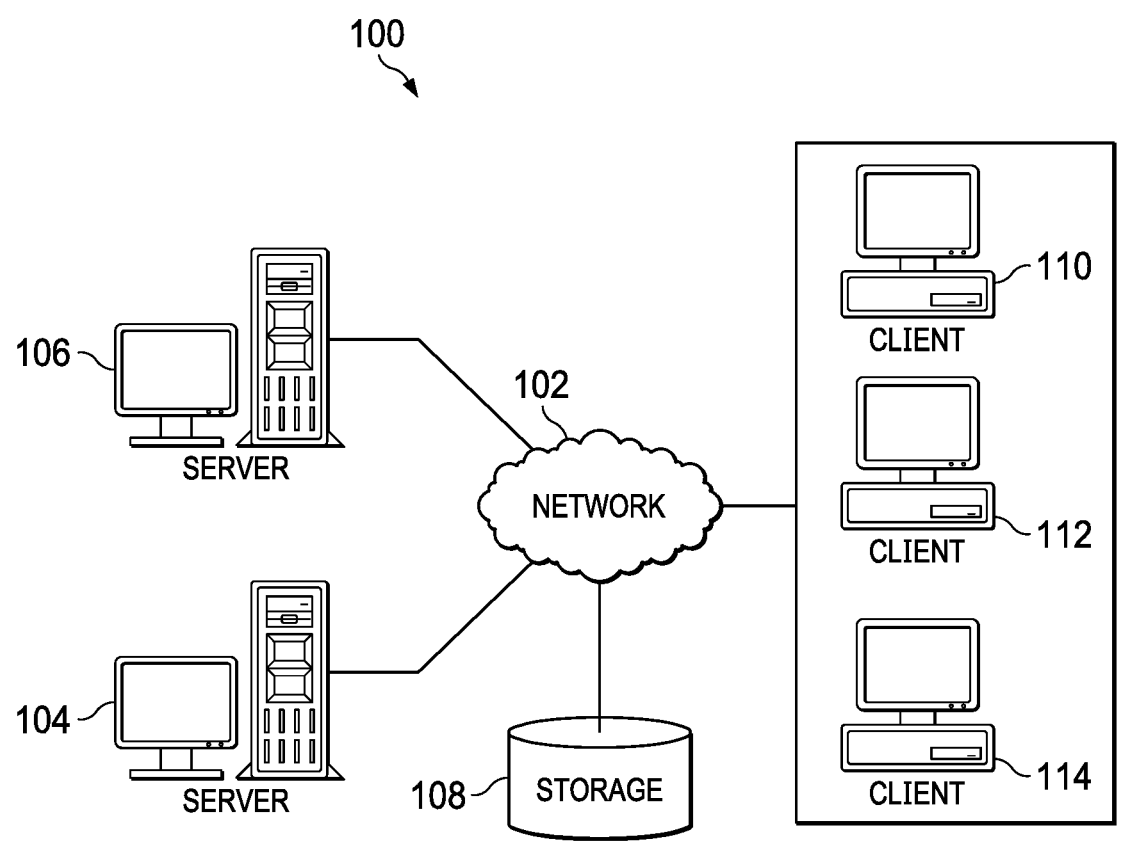
FIG. 1 is a diagram of a data processing environment in accordance with an illustrative embodiment.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation, with regard to the environments in which the different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is a medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers include client computer 110, client computer 112, and client computer 114. Client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, the program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, a laptop computer, a bus with a vehicle computer, and other suitable types of clients.

Figure 2:
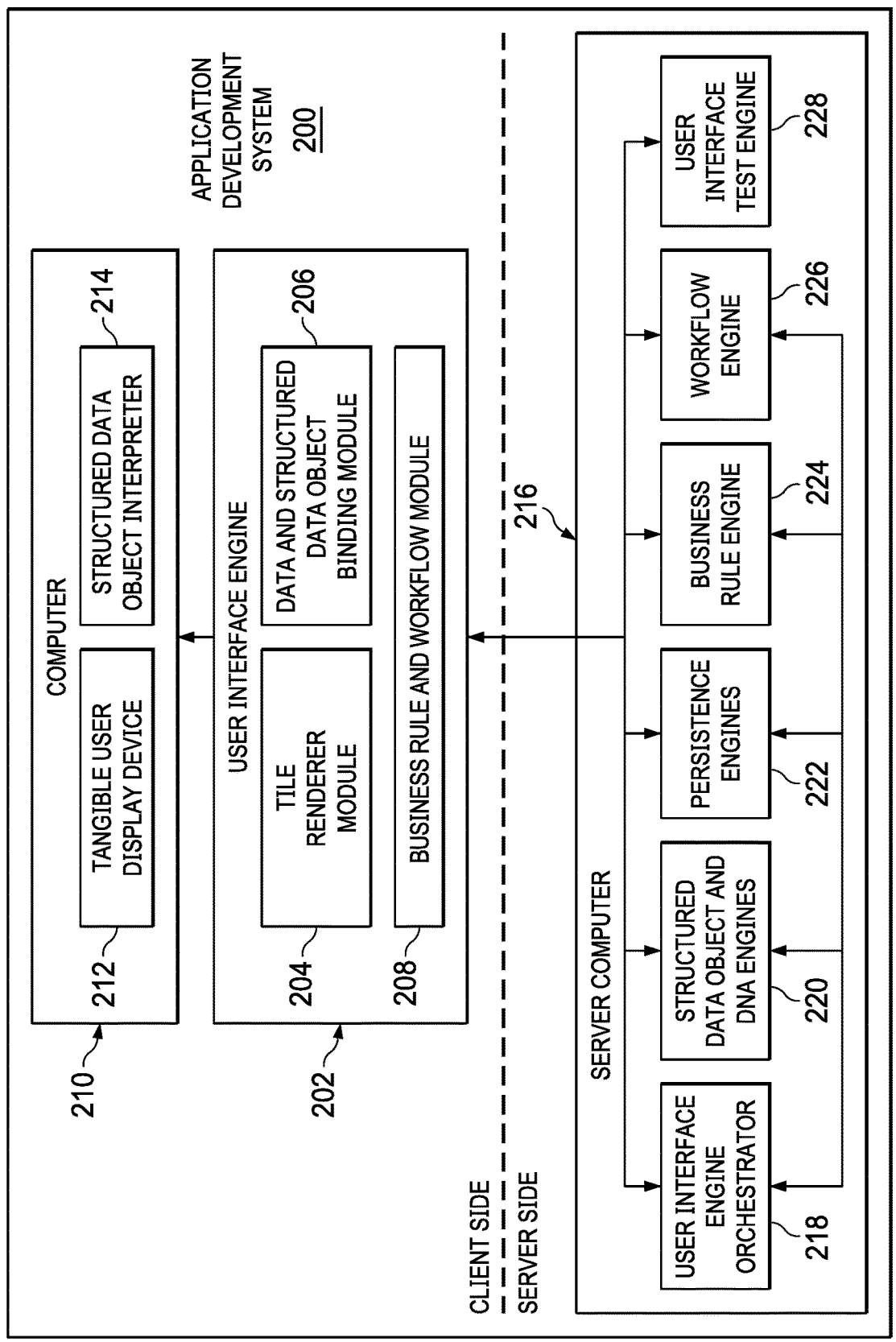
FIG. 2 is a block diagram of an application development system for a domain-specific language entirely composed of structured data objects in accordance with an illustrative embodiment.

FIG. 2 is a block diagram illustrating an application development system for a domain-specific language entirely composed of structured data objects depicted in accordance with an illustrative embodiment. Application development system 200 may be used to manipulate composable data nodes to build at least one of business rules, miniapps, and apps. Application development system 200 can be implemented in one or more of server computer 104, client computer 110, client computer 112, and client computer 114 of FIG. 1.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

User interface engine 202 is computer code, underlying data and structured data objects which provide underlying functionality and implementation capability for application designers. Primarily, user interface engine 202 operates client-side, meaning that user interface engine 202 operates on a specific client user's computer. In one illustrative example, user interface engine 202 could be a Web browser or an extension to a Web browser.

Underlying the user interface, user interface engine 202 may include one or more modules. As depicted, user interface engine 202 includes tile renderer module 204, data and structured data object binding module 206, and business rule and workflow module 208. Each module may be considered a collection of software or computer code which implements the functionality of the module.

Tile renderer module 204 is computer code which computer 210 may use to render tiles on tangible user display device 212. Tile renderer module 204 may receive input from the user, from data and structured data object binding module 206, and from business rule and workflow module 208 to change and manipulate both the functionality of computer 210, which is used to execute tile renderer module 204, as well as tangible user display device 212, which is used to display rendered tiles.

Data and structured data object binding module 206 is computer code which computer 210 may use to bind data and structured data objects to the user interface, possibly a browser, so that user interface engine 202 may keep track of all of the data and structured data objects used in executing business rules and workflows, as well as rendering tiles. Additional details regarding the functionality of data and structured data object binding module 206 is described below with respect to how data and structured data objects are used in user interface engine 202.

Business rule and workflow module 208 is computer code which computer 210 may use to create, join, merge, or otherwise manipulate composable data nodes in order to create miniapps, collections, and bundles.

Business rule and workflow module 208, using data and structured data objects tracked by data and structured data object binding module 206, is the underlying code which allows a user to manipulate tiles rendered by tile renderer module 204 and thereby create miniapps, collections, and bundles without the user having to code any of the software being developed. Business rule and workflow module 208 may use composable data nodes, together with workflows and business rules to create the miniapps, collections, or bundles in a user-perceived codeless development environment.

Structured data object interpreter 214 is hardware or software which is used to interpret or execute business rules in a business system. Structured data object interpreter 214 can be software residing in a Web browser on computer 210. However, the illustrative embodiments are not necessarily limited to only client computers or Web browsers.

Structured data object interpreter 214 is a code interpreter designed for a domain-specific language entirely composed of structured data objects. In one illustrative example, structured data object interpreter 214 takes the form of an abstract syntax tree (AST) interpreter with the exception that the abstract syntax tree (AST) structure is composed of well-defined data nodes constructs, joined together in a domain-specific language. Because the data node constructs are well-defined when they are constructed, structured data object interpreter 214 executes the composition of structured data objects without compilation. Data note constructs are composed into well-defined structured data objects according to selected block types and properties, replacing the tokenization and parsing that would otherwise occur during compilation.

In some illustrative embodiments, user interface engine 202 may take advantage of some server side services operating on one or more server computers, such as server computer 216. "Server side" means that computer 210 communicates with server computer 216, possibly over a network such as the Internet. Server side resources are provided to support user interface engine 202. While not always necessary for implementation of user interface engine 202, server side resources can enhance the functionality of user interface engine 202.

For example, the server side resources may include user interface engine orchestrator 218. In some exemplary illustrative embodiments, user interface orchestrator 218 may be considered part of user interface engine 202 such that user interface engine 202 operates partially both on computer 210, but also on one or more server computers, such as server computer 216.

User interface orchestrator 218 may serve as a proxy to speed up processing of user interface engine 202. User interface orchestrator 218 may retrieve structured data objects and then identify whether data queries are for customer data, business rules, or any other structured data objects. User interface orchestrator 218 may then request such data, objects, or code from the data center operating server side. User interface orchestrator 218 may cache retrieved data, structured data objects, code, workflows, or other objects to be sent back to user interface engine 202.

Server side services may include other components other than user interface orchestrator 218. For example, server side resources could include one or more of structured data object and DNA engines 220, which can be used to manage or provide structured data objects for use in user interface engine 202. Server side resources may also include one or more persistence engines 222, which can be used to save work done using user interface engine 202. Server side resources may also include business rule engine 224, which may be used to create or store business rules that are used by user interface engine 202 in the user-perceived codeless building of miniapps, collections, and bundles.

Server side resources may also include workflow engine 226, which may be used to create or store workflows that are used by user interface engine 202 in the user-perceived codeless building of miniapps, collections, and bundles.

Server side resources may also include user interface test engine 228, which may be used to test both the functionality of user interface engine 202, possibly as well as the miniapps, collections, and bundles created using user interface engine 202.

Figure 3:
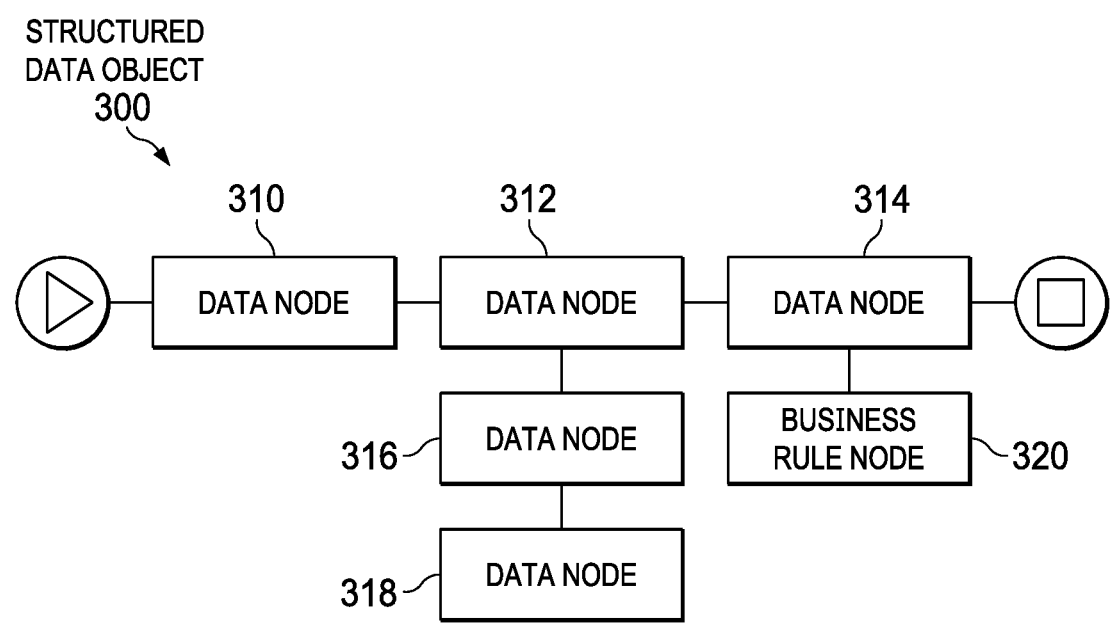
FIG. 3 is a block diagram of a structured data object in accordance with an illustrative embodiment.

With reference next to FIG. 3, an illustration of a block diagram of a structured data object is depicted in accordance with an illustrative embodiment. Structured data object 300 is an example of a composition of well-defined data nodes that can be linked together according to a domain specific language to create miniapps, collections, or bundles in a user-perceived codeless development environment, such as application development system 200 of FIG. 2.

Structured data object 300 includes data nodes 310, 312, and 314. Data nodes 310, 312, and 314 are well-defined structured data objects that can be manipulated within data and structured data binding module 206 of FIG. 2 to create desired business rules. Tile renderer module 204 of user interface engine 202 may visually present data nodes 310, 312, and 314, enabling the user to build different business rules, miniapps and apps in application development system 200 of FIG. 2. Each of data nodes 310, 312, and 314 correlate to one or more functions, which in turn can be interpreted by structured data object interpreter 214 of FIG. 2 for implementing the corresponding business rule. The different permutations of the compositions of these functions, as well as differentiated input, enable the execution of the different business rule behaviors at runtime.

The functions of data nodes 310, 312, and 314 operate inside of a context defined at the beginning of the business rule execution step, which is the target object for all symbols defined in the course of the business rule execution, as well as for all input to and output from the business rule itself. In this manner, data nodes 310, 312, and 314 act as a configuration object to the code being executed, defining an execution context (or scope being executed against) to other joined data nodes.

For example, structured data object 300 further includes data node 316. Data node 316 provides additional context for execution of related data node 312. Specifically, data node 316 may indicate that data node 312, as well as child data nodes thereof, should be interpreted within the context of data node 316.

Structured data object 300 further includes data node 318. Data node 318 provides additional context for execution of both related data node 312 and data node 316. For example, data node 318 may indicate that information required for execution of data node 312 should be requested and received from one or more web services. Data node 318 requests and returns the same context updated with the information received through the web services.

Structured data object 300 further includes business rule node 320. Business rule node 320 provides additional context for execution of related data node 314. Specifically, business rule node 320 may indicate a consuming service for receipt of business rule output provided by related data node 314. Business rule node 320 requests and returns information to a consuming service, such as a web page.

Figure 4:
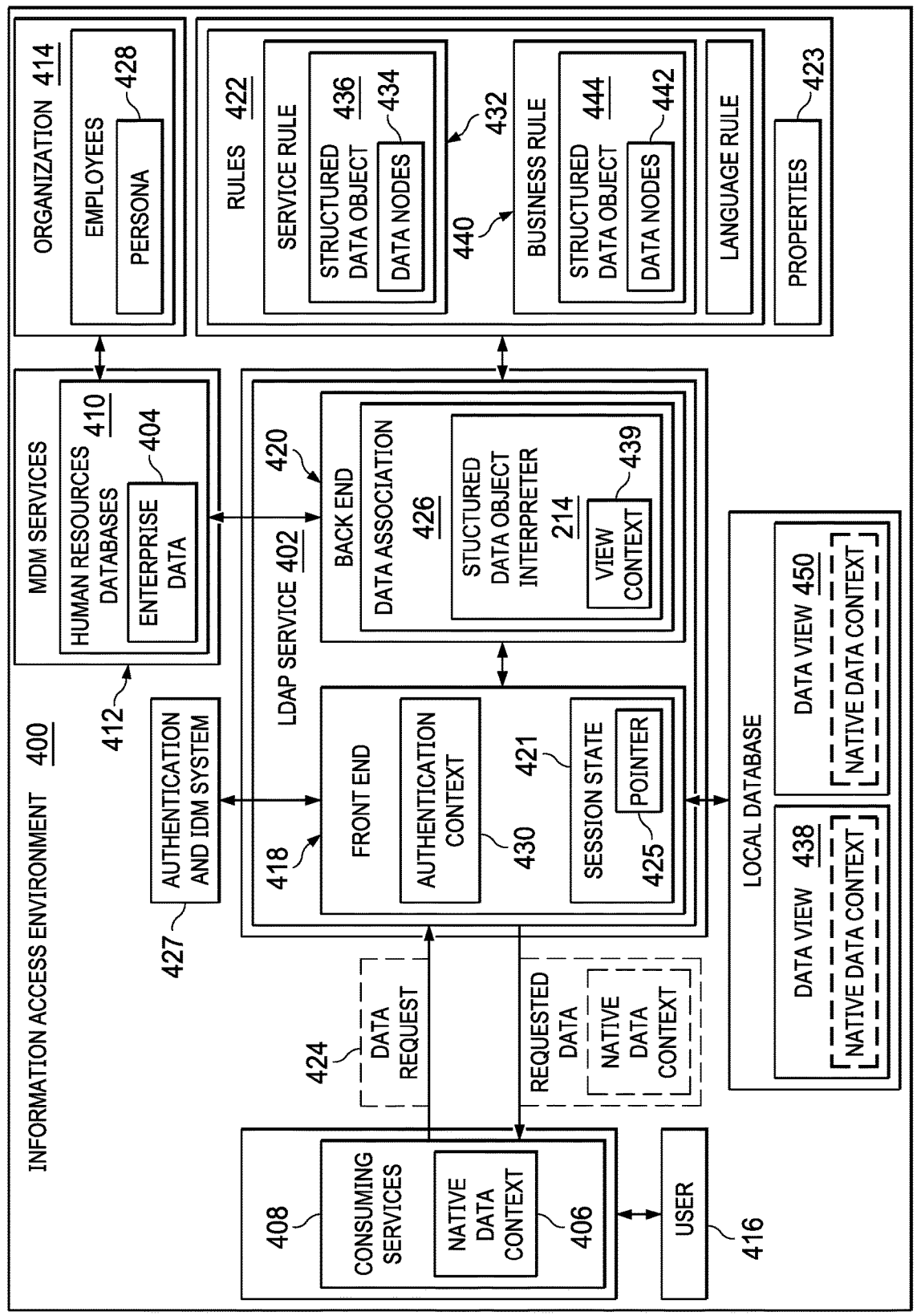
FIG. 4 is a block diagram of an information access environment in accordance with an illustrative example.

With reference next to FIG. 4, a block diagram of an information access environment is depicted in accordance with an illustrative example. Information access environment 400 includes lightweight directory access protocol (LDAP) service 402. LDAP service 402 facilitates consumption of enterprise data 404 within native data context 406 of consuming services 408, thereby enabling human resources database 410 to provide master data management (MDM) services 412 for organization 414.

As used herein, software or data formats that are "native" to a system are those that the system supports with minimal computational overhead and additional components. Something running on a computer natively means that it is running without any external layer requiring fewer software layers. Applied to data, native data formats or communication protocols are those supported by a certain computer hardware or software, with maximal consistency and minimal amount of additional components.

LDAP service 402 provides native access to enterprise data 404, which in turn can be consumed by consuming services 408. Lightweight directory access protocol (LDAP) is a request-response application protocol for accessing and maintaining distributed directory services. LDAP service 402 is a LDAP interface that provides a singular point of access for consuming services 408 to access, manage, and update enterprise data 404 through the Transmission Control Protocol/Internet Protocol (TCP/IP) protocol stack. By controlling access to human resources database 410, LDAP service 402 enables human resources databases 410 as a system of record data source.

LDAP service 402 may be implemented in software, hardware, firmware, or a combination thereof. When software is used, the operations performed by LDAP service 402 may be implemented in program code configured to run on hardware, such as a processor unit. When firmware is used, the operations performed by LDAP service 402 may be implemented in program code and data and stored in persistent memory to run on a processor unit. When hardware is employed, the hardware may include circuits that operate to perform the operations in LDAP service 402.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

In one illustrative example, LDAP service 402 includes a number of different components. As used herein, "a number of" components means one or more different components. As depicted, LDAP service 402 includes front end 418 and back end 420.

Front end 418 may be invoked when data request 424 is received from consuming services 408. Front end 418 may intercept and decrypt transport layer security (TLS) login commands to extract access information, such as a username and password. Front end 418 may perform identity management authentication of user 416 using the extracted password. Alternatively, front-end 418 may simply relay data request 424 to authentication and identity management system 427, eliminating the need to hook incoming traffic.

Back end 420 exposes enterprise data 404 to consuming services 408. LDAP service 402 accesses and consumes enterprise data 404 by interpreting one or more of rules 422. Data association 426 uses rules 422 to enable consuming services 408 to consume enterprise data 404 according to native data context 406 of consuming services 408. Additionally, data association 426 uses rules 422 to enable user 416 to access enterprise data 404 according to data view 438 for persona 428 of user 416 within organization 414.

Each of rules 422 is a structured data object comprising a composition of well-defined data nodes that are linked together according to a domain specific language in a user-perceived codeless development environment, such as application development system 200 of FIG. 2. Each of rules 422 may be an example of structured data object 300 of FIG. 3.

According to an illustrative example, LDAP service 402 provides a method for natively accessing enterprise data 404 according to an identified view context 439. In this illustrative example, LDAP service 402 receives data request 424 from consuming services 408. Data request 424 is a request to access enterprise data 404 within human resources databases 410. In one illustrative example, data request 424 is an HTTP request to access enterprise data 404 at a RESTful API between consuming services 408 and human resources databases 410.

Data request 424 is received from consuming services 408 within authentication context 430 of user 416. For example, authentication context 430 can be indicated in the HTTP request. Authentication context 430 can include authorization attributes provided by authentication and identity management system 427, such as one or more of tokens, usernames, passwords, and other access credentials that uniquely identify user 416 within the context of organization 414.

While data request 424 is described as an HTTP request, other suitable communication protocols can also be used without HTTP traffic. For example, data request 424 can be an Open Database Connectivity (ODBC) request, passing user credentials as part of the database authorization.

Data association 426 determines native data context 406 for consuming services 408 by applying service rule 432 to data request 424. For example, information extracted from data request 424 is mapped to service rule 432. Service rule 432 comprises a set of data nodes 434 that are composed into structured data object 436 according to a domain-specific language. Structured data object interpreter 214 interprets service rule 432 to determine native data context 406 of consuming services 408.

In one illustrative example, one or more of service rule 432, and business rule 440 is an abstract syntax tree (AST) structure composed of well-defined data nodes constructs, joined together in a domain-specific language. LDAP service 402 enters the syntax tree and the requested enterprise data into structured data object interpreter 214. Structured data object interpreter 214 produces a result without using executable code to achieve the result, such that a compiler operation to generate computer code for implementing one or more of service rule 432 and business rule 440 is avoided.

LDAP service 402 creates data view 438 according to native data context 406 determined from service rule 432. Data view 438 is a data seeding window according to authentication context 430. Data view 438 enables assignment of the correct data context, including one or more of permissions, schema and business roles, for native data context 406. For example, LDAP service 402 creates data view 438 according to rules 422 and properties 423 indicated within a plurality of linked data nodes 434 and 442.

In one illustrative example, front end 418 maintains session state 421, including pointer 425. In response to creating data view 438, front end 418 sets pointer 425 to indicate data view 438.

In one illustrative example, structured data object interpreter 214 interprets structured data object 436 and structured data object 444. Structured data object 436 includes a set of data nodes 434 and structured data object 444 includes a set of data nodes 442. Set of data nodes 434 and set of data nodes 442 are defined by a domain-specific language entirely consisting of composable data nodes. For example, the set of data nodes 434 and the set of data nodes 442 can include one or more of data nodes 310, 312, 314, 316, 318 and business rule node 320 of FIG. 3.

In one illustrative example, LDAP service 402 identifies authentication context 430 from data request 424. Based on authentication context 430, LDAP service 402 determines persona 428 of user 416 within organization 414. Data association 426 determines view context 439 based on persona 428 of user 416.

For example, LDAP service 402 maps authentication context 430 from data request 424 to an employee identifier of user 416 within organization 414. The employee identifier can be an entry in human resources databases 410. Structured data object interpreter 214 interprets the set of data nodes 434 within a context of the employee identifier to determine persona 428 of user 416.

Data association 426 determines view context 439 for enterprise data 404 by applying business rule 440 to enterprise data 404 within authentication context 430 of user 416. Business rule 440 comprises the set of data nodes 442 that is composed into structured data object 444 according to a domain-specific language.

In interpreting the structured data objects, structured data object interpreter 214 identifies rules 422 and properties 423 for business rule 440. Rules 422 and properties 423 are indicated within one or more of the plurality of linked data nodes 434 and the plurality of linked data nodes 442. Structured data object 436 and 444 are interpreted by structured data object interpreter 214, allowing consuming services 408 to natively consume enterprise data 404 within a determined view context 439.

For example, structured data object interpreter 214 interprets the set of data nodes 442 within a context of the employee identifier to determine persona 428 of the user 416. Structured data object interpreter 214 interprets the set of data nodes 244 within a context of persona 426 of user 416 to determine view context 439 for user 416 that is allowed by business rule 440. LDAP service 402 populates data view 438 according to view context 439 determined by business rule 446.

LDAP service 402 provides the requested data to consuming service 408 from data view 438. Consuming service 408 consumes enterprise data 404 from data view 438. Requested data from data view 438 is consumed in native data context 406 for consuming services 408 according to view context 439 of persona 428.

In one illustrative example, when a subsequent data request is received, front end 418 locks the data views. LDAP service 402 refreshes the data by creating and populating data view 450. LDAP service 402 creates and populates data view 450 in a manner similar to that employed to create data view 438. By creating data view 450, LDAP service 402 ensures that user 416 is provided with the most up-to-date version of enterprise data 404. LDAP service 402 sets pointer 425 to indicate data view 450, and unlocks data views. LDAP service 402 provides the requested data to consuming services 408 from data view 450. Consuming services 408 consume enterprise data 404 from data view 450. Requested data from data view 450 is consumed in native data context 406 for consuming services 408 according to view context 439 of persona 428.

As a result, when implemented in a computer system, LDAP service 402 operates as a special purpose computer system in which LDAP service 402 enables consuming services 408 to consume enterprise data 404 according to native data context 406 of consuming services 408. Additionally, LDAP service 402 enables user 416 to access enterprise data 404 according to view context 439 for persona 426 of user 416 within organization 414. Therefore, LDAP service 402 transforms a computer system into a special purpose computer system as compared to currently available general computer systems that do not have LDAP service 402.

Figure 5:
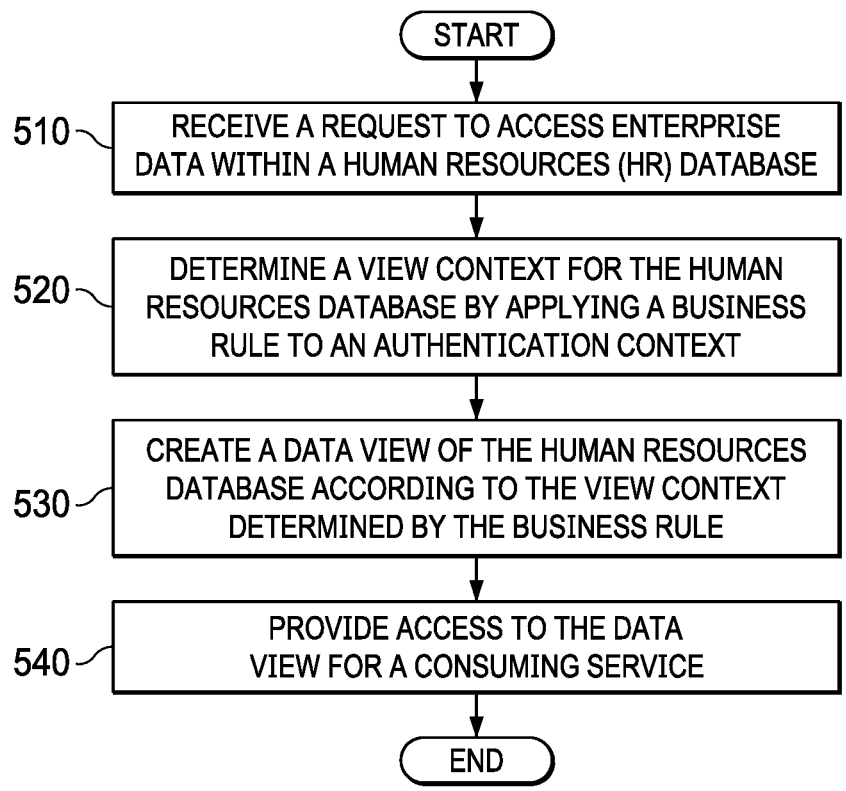
FIG. 5 is an illustration of a flowchart of a process for natively accessing enterprise data according to an identified view context in accordance with an illustrative embodiment.

With reference next to FIG. 5, an illustration of a flowchart of a process for natively accessing enterprise data according to an identified view context is depicted in accordance with an illustrative embodiment. The process of FIG. 5 can be a software process implemented in one or more components of a lightweight directory access protocol service, such as LDAP service 402 of FIG. 4.

The process begins by receiving a request to access enterprise data within a human resources (HR) database (step 510). The request is received from a consuming service within an authentication context of a user.

The process determines a view context for the human resources database by applying a business rule to an authentication context (step 520). The business rule comprises a set of data nodes that are composed into a structured data object according to a domain-specific language.

Next, the process creates a data view of the human resources database according to the view context determined by the business rule (step 530).

Afterwards, the process provides access to the data view for a consuming service (step 540), with the process terminating thereafter. The enterprise data is natively accessed through the data.

Figure 6:
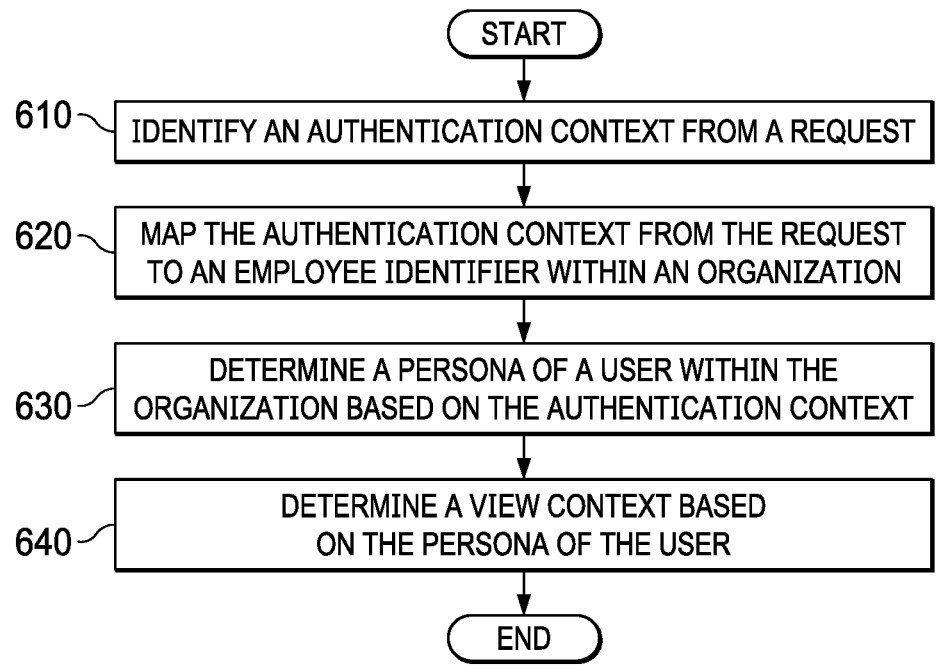
FIG. 6 is an illustration of a flowchart of a process for determining a view context for natively accessible enterprise data in accordance with an illustrative embodiment.

Referring next to FIG. 6, an illustration of a flowchart of a process for determining a view context for natively accessible enterprise data is depicted in accordance with an illustrative embodiment. The process of FIG. 6 is a more detailed description of step 520 of FIG. 5.

The process identifies an authentication context from a request (step 610). Next, the process maps the authentication context from the request to an employee identifier within an organization (step 620).

The process determines a persona of a user within an organization based on the authentication context (step 630). The set of data nodes is interpreted within a context of the employee identifier to determine the persona of the user.

The process then determines a view context based on the persona of the user (step 640), with the process terminating thereafter. The set of data nodes is interpreted within a context of the persona of the user to determine the view context for the user that is allowed by the business rule.

Figure 7:
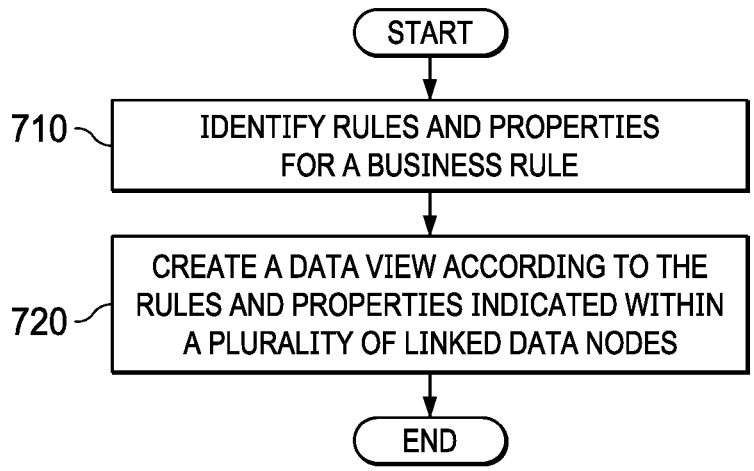
FIG. 7 is an illustration of a flowchart of a process for interpreting a set of data nodes to natively access enterprise data in accordance with an illustrative embodiment.

Referring next to FIG. 7, an illustration of a flowchart of a process for interpreting a set of data nodes to natively access enterprise data is depicted in accordance with an illustrative embodiment. The process of FIG. 7 is an illustrative example of one or more of steps 630 and 640 of FIG. 6.

As part of interpreting a set of data nodes, the process identifies rules and properties for a business rule (step 710). The rules and properties are indicated within the plurality of linked data nodes.

As part of creating a data view, the process creates a data view according to the rules and properties indicated within a plurality of linked data nodes (step 720), with the process terminating thereafter.

Figure 8:
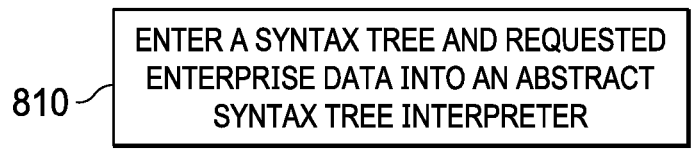
FIG. 8 is an illustration of a flowchart of a process for determining a view context for natively accessible enterprise data in accordance with an illustrative embodiment.

Referring next to FIG. 8, an illustration of a flowchart of a process for determining a view context for natively accessible enterprise data is depicted in accordance with an illustrative embodiment. The process of FIG. 8 is an illustrative example of one or more of steps 630 and 640 of FIG. 6.

The process enters a syntax tree and requested enterprise data into an abstract syntax tree interpreter (step 810). A compiler operation to generate computer code for implementing the business rule is avoided. Executing the abstract syntax tree interpreter produces a result without using executable code to achieve the result.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 9:
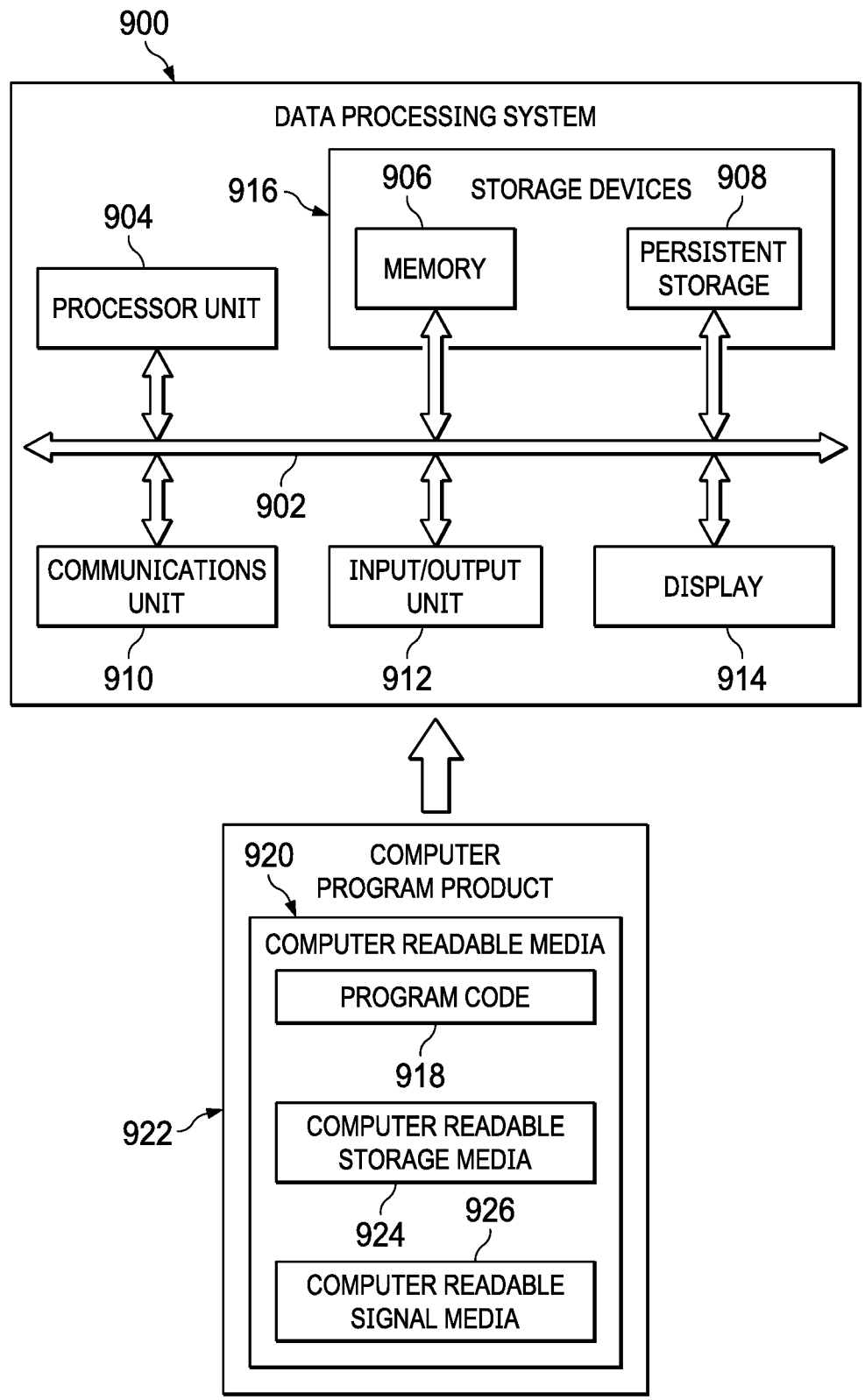
FIG. 9 is a block diagram of a data processing system in accordance with an illustrative embodiment.

Turning now to FIG. 9, an illustration of a block diagram of a data processing system is depicted in accordance with an illustrative embodiment. Data processing system 900 may be used to implement one or more of the computers of network data processing system 100 in FIG. 1, computer 210 and server computer 216 of FIG. 2, as well as other data processing systems that may be used in Information access environment 400 of FIG. 4.

In this illustrative example, data processing system 900 includes communications framework 902, which provides communications between processor unit 904, memory 906, persistent storage 908, communications unit 910, input/output (I/O) unit 912, and display 914. In this example, communications framework 902 may take the form of a bus system.

Processor unit 904 serves to execute instructions for software that may be loaded into memory 906. Processor unit 904 may be a number of processors, a multi-processor core, or some other type of processor, depending on the particular implementation.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer readable storage devices in these illustrative examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a solid state hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these illustrative examples. In one example, computer readable media 920 may be computer readable storage media 924 or computer readable signal media 926.

In these illustrative examples, computer readable storage media 924 is a physical or tangible storage device used to store program code 918 rather than a medium that propagates or transmits program code 918.

Alternatively, program code 918 may be transferred to data processing system 900 using computer readable signal media 926. Computer readable signal media 926 may be, for example, a propagated data signal containing program code 918. For example, computer readable signal media 926 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code 918.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for natively accessing enterprise data according to an identified view context, the method comprising:
   maintaining an authentication context of a user within a lightweight directory access protocol (LDAP) interface in communication with a human resources (HR) database, wherein the LDAP interface serves as a proxy for requests between a consuming service and the HR database, wherein the LDAP interface serves as a system of record data source;
   receiving an HTTP request to access enterprise data at a RESTful API between the consuming service and the HR database, wherein the request is received from a consuming service within the authentication context of a user;
   determining a view context for the human resources (HR) database by applying a business rule to the authentication context, wherein the business rule comprises a set of data nodes that are composed into a structured data object according to a domain specific language;
   creating a data view of the HR database according to the view context determined by the business rule; and
   providing the data view to the consuming service, where in the enterprise data is natively accessed through the data view.

2. The computer-implemented method of claim 1, wherein the LDAP interface maintains the authentication context on an on-demand basis.

3. The computer-implemented method of claim 1, wherein the authentication context is indicated in the HTTP request.

4. The computer-implemented method of claim 1, wherein creating the data view further comprises:
   Generating a data seeding window according to the authentication context, wherein the data seeding window enables assignment of the data view for the consuming service according to a native data context of the consuming service.

5. The computer-implemented method of claim 1, wherein determining the view context further comprises:
   identifying the authentication context from the request;
   determining a persona of the user within an organization based on the authentication context;
   determining the view context based on the persona of the user; and
   redirecting the request to the data view according to session data.

6. The computer-implemented method of claim 5, wherein receiving the request further comprises:
   locking the data views;
   refreshing the data views; and
   unlocking the data views.

7. The computer-implemented method of claim 6, wherein the data view is a first data view, and wherein refreshing the data views further comprises:
   creating a second data view of the HR database according to the view context determined by the business rule; and
   setting a pointer to the session data to indicate the second data view.

8. The computer-implemented method of claim 5, further comprising:
   mapping the authentication context from the request to an employee identifier of within an organization;
   interpreting the set of data nodes within a context of the employee identifier to determine the persona of the user; and
   interpreting the set of data nodes within a context of the persona of the user to determine the view context for the user that is allowed by the business rule.

9. The computer-implemented method of claim 8, wherein interpreting the set of data nodes further comprises:
   identifying rules and properties for the business rule, wherein the rules and properties are indicated within the plurality of linked data nodes; and wherein creating the data view further comprises:
creating the data view according to the rules and properties indicated within the plurality of linked data nodes.

10. The computer-implemented method of claim 8, wherein interpreting the set of data nodes forms a syntax tree, the method further comprising:
entering the syntax tree and the requested enterprise data into an abstract syntax tree interpreter, wherein a compiler operation to generate computer code for implementing the business rule is avoided, and wherein executing the abstract syntax tree interpreter produces a result without using executable code to achieve the result.

11. A computer system comprising:
a hardware processor; and
a lightweight directory access protocol (LDAP) service in communication with the hardware processor, wherein the LDAP service:
maintains an authentication context of a user within a lightweight directory access protocol (LDAP) interface in communication with a human resources (HR) database, wherein the LDAP interface serves as a proxy for requests between a consuming service and the HR database, wherein the LDAP interface serves as a system of record data source;
receives an HTTP request to access enterprise data at a RESTful API between the consuming service and the HR database, wherein the request is received from a consuming service within the authentication context of a user;
determines a view context for the HR database by applying a business rule to the authentication context, wherein the business rule comprises a set of data nodes that are composed into a structured data object according to a domain specific language;
creates a data view of the HR database according to the view context determined by the business rule; and
provides the data view to the consuming service, where in the enterprise data is natively accessed through the data view.

12. The computer system of claim 11, wherein the LDAP interface maintains the authentication context on an on-demand basis.

13. The system of claim 11,
wherein the authentication context is indicated in the HTTP request.

14. The computer system claim 11, wherein in creating the data view, the LDAP service further:
generates a data seeding window according to the authentication context, wherein the data seeding window enables assignment of the correct data view for the consuming service according to a native data context of the consuming service.

15. The computer system of claim 11, wherein in determining the view context, the LDAP service further:
identifies the authentication context from the request;
determines a persona of the user within an organization based on the authentication context;
determines the view context based on the persona of the user; and
redirects the request to the data view according to session data.

16. The computer system of claim 15, wherein in receiving the request, the LDAP service further:
locks the data views;
refreshes the data views; and
unlocks the data views.

17. The computer system of claim 16, wherein the data view is a first data view, and wherein in refreshing the data views, the LDAP service further:
creates a second data view of the HR database according to the view context determined by the business rule; and
sets a pointer to the session data to indicate the second data view.

18. The computer system of claim 16, wherein the LDAP service further:
maps the authentication context from the request to an employee identifier of within an organization;
interprets the set of data nodes within a context of the employee identifier to determine the persona of the user; and
interprets the set of data nodes within a context of the persona of the user to determine the view context for the user that is allowed by the business rule.

19. The computer system of claim 18, wherein in interpreting the set of data nodes, the LDAP service further:
identifies rules and properties for the business rule, wherein the rules and properties are indicated within the plurality of linked data nodes; and
wherein in creating the data view, the LDAP service further:
creates the data view according to the rules and properties indicated within the plurality of linked data nodes.

20. The computer system of claim 18, wherein interpreting the set of data nodes forms a syntax tree, the LDAP service further:
integers the syntax tree and the requested enterprise data into an abstract syntax tree interpreter, wherein a compiler operation to generate computer code for implementing the business rule is avoided, and wherein executing the abstract syntax tree interpreter produces a result without using executable code to achieve the result.

21. A computer program product for natively accessing enterprise data according to an identified view context, the computer program product comprising:
a non-transitory computer readable storage medium;
program code, stored on the computer readable storage medium for maintaining an authentication context of a user within a lightweight directory access protocol (LDAP) interface in communication with a human resources (HR) database, wherein the LDAP interface serves as a proxy for requests between a consuming service and the HR database, wherein the LDAP interface serves as a system of record data source;
program code, stored on the computer readable storage medium, for receiving an HTTP request to access enterprise data at a RESTful API between the consuming service and the HR database, wherein the request is received from a consuming service within the authentication context of a user;
program code, stored on the computer readable storage medium, for determining a view context for the HR database by applying a business rule to the authentication context, wherein the business rule comprises a set of data nodes that are composed into a structured data object according to a domain specific language;
program code, stored on the computer readable storage medium, for creating a data view of the HR database according to the view context determined by the business rule; and program code, stored on the computer readable storage medium, for providing the data view to the consuming service, where in the enterprise data is natively accessed through the data view.

22. The computer program product of claim 21, wherein the LDAP interface maintains the authentication context on an on-demand basis.

23. The computer program product of claim 21, wherein the authentication context is indicated in the HTTP request.

24. The computer program product of claim 21, wherein the program code for creating the data view further comprises:
  program code, stored on the computer readable storage medium, for generating a data seeding window according to the authentication context, wherein the data seeding window enables assignment of the correct data view for the consuming service according to a native data context of the consuming service.

25. The computer program product of claim 21, wherein the program code for determining the view context further comprises:
  program code, stored on the computer readable storage medium, for identifying the authentication context from the request;
  program code, stored on the computer readable storage medium, for determining a persona of the user within an organization based on the authentication context;
  program code, stored on the computer readable storage medium, for determining the view context based on the persona of the user; and
  program code, stored on the computer readable storage medium, for redirecting the request to the data view according to session data.

26. The computer program product of claim 25, wherein the program code for receiving the request further comprises:
  program code, stored on the computer readable storage medium, for locking the data views;
  program code, stored on the computer readable storage medium, for refreshing the data views; and
  program code, stored on the computer readable storage medium, for unlocking the data views.

27. The computer program product of claim 26, wherein the data view is a first data view, and wherein the program code for refreshing the data views further comprises:
  program code, stored on the computer readable storage medium, for creating a second data view of the HR database according to the view context determined by the business rule; and
  program code, stored on the computer readable storage medium, for setting a pointer to the session data to indicate the second data view.

28. The computer program product of claim 25, further comprising:
  program code, stored on the computer readable storage medium, for mapping the authentication context from the request to an employee identifier of within an organization;
  program code, stored on the computer readable storage medium, for Interpreting the set of data nodes within a context of the employee identifier to determine the persona of the user; and
  program code, stored on the computer readable storage medium, for Interpreting the set of data nodes within a context of the persona of the user to determine the view context for the user that is allowed by the business rule.

29. The computer program product of claim 28, wherein the program code for interpreting the set of data nodes further comprises:
  program code, stored on the computer readable storage medium, for identifying rules and properties for the business rule, wherein the rules and properties are indicated within the set of data nodes; and
  wherein program code for creating the data view further comprises:
    program code, stored on the computer readable storage medium, for creating the data view according to the rules and properties indicated within the set of data nodes.

30. The computer program product of claim 28, wherein interpreting the set of data nodes forms a syntax tree, the computer program product further comprising:
  program code, stored on the computer readable storage medium, for entering the syntax tree and the requested enterprise data into an abstract syntax tree interpreter, wherein a compiler operation to generate computer code for implementing the business rule is avoided, and wherein executing the abstract syntax tree interpreter produces a result without using executable code to achieve the result.

* * * * *